Aug. 12, 1941.  M. McC. BEARY  2,252,678
EDUCATIONAL GAME DEVICE
Filed Dec. 9, 1939  3 Sheets-Sheet 1

Inventor
Mary McC. Beary
By Clarence A. O'Brien
and Hyman Berman
Attorneys

Aug. 12, 1941.  M. McC. BEARY  2,252,678
EDUCATIONAL GAME DEVICE
Filed Dec. 9, 1939  3 Sheets-Sheet 2
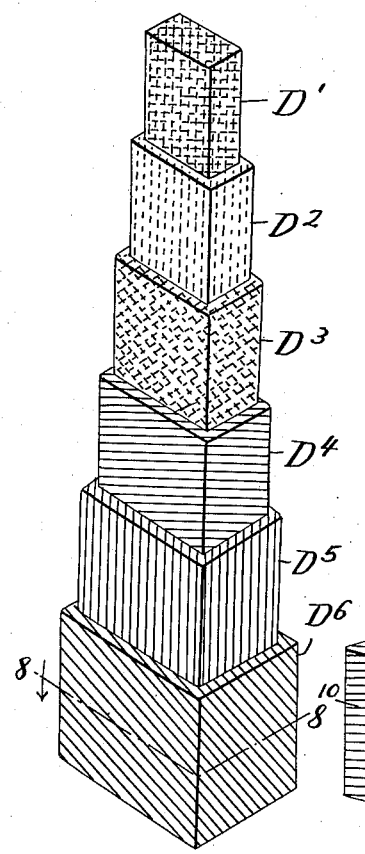
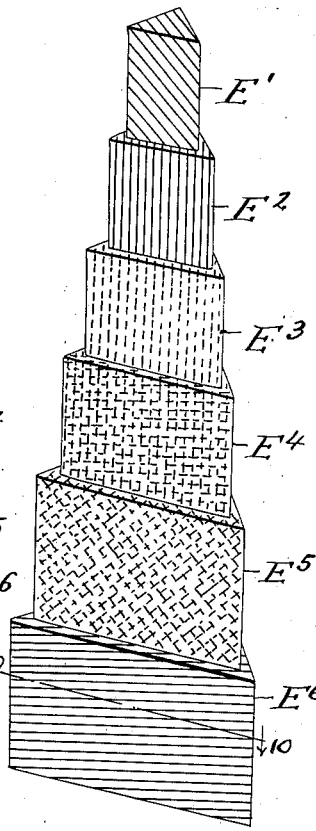
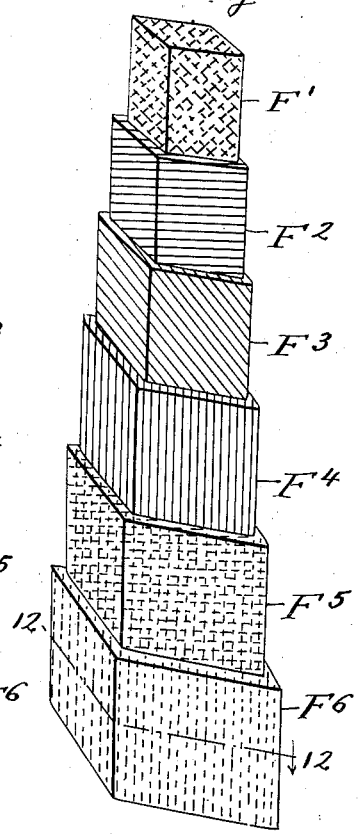
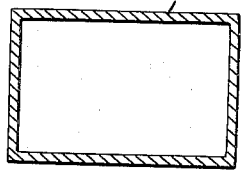
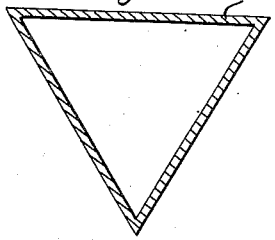
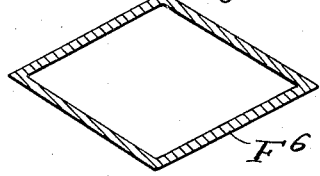
Inventor
Mary McC. Beary
By Clarence A. O'Brien
and Hyman Berman
Attorneys Aug. 12, 1941.   M. McC. BEARY   2,252,678
EDUCATIONAL GAME DEVICE
Filed Dec. 9, 1939   3 Sheets-Sheet 3

Inventor
Mary McC. Beary
By Clarence A. O'Brien
and Hyman Berman
Attorneys

Patented Aug. 12, 1941

2,252,678

UNITED STATES PATENT OFFICE 2,252,678

EDUCATIONAL GAME DEVICE

Mary McC. Beary, Catasauqua, Pa.

Application December 9, 1939, Serial No. 308,466

6 Claims. (Cl. 35—26)

My invention relates to improvements in educational game devices for teaching in an entertaining manner the characteristics of form or shape, color, and color appreciation, and relative size or mass of forms, and particularly to an arrangement of this kind which, while especially adaptable to use in training younger students, is also admirably adapted to adult education, the arrangement being attention compelling and interest sustaining in character, so as to afford an efficient instrument in education combined with entertainment.

Important objects and advantages of my invention will be apparent from a reading of the following description in connection with the drawings wherein for purposes of illustration I have shown a preferred embodiment of my invention.

In the drawings:

Figure 7 is a similar column of rectangular blocks showing the three primary and three binary colors.

Figure 8 is a horizontal sectional view taken through Figure 7 approximately on the line 8—8 and looking downwardly in the direction of the arrow.

Figure 9 is a similar column of triangular blocks showing the three primary and three binary colors.

Figure 10 is a horizontal sectional view taken through Figure 9 approximately on the line 10—10 and looking downwardly in the direction of the arrow.

Figure 11 is a similar column of diamond-shaped blocks showing the three primary and the three binary colors.

Figure 12 is a horizontal sectional view taken through Figure 11 approximately on the line 12—12 and looking downwardly in the direction of the arrow.

Referring in detail to the drawings, the numeral 5 generally designates a box of a suitable shape to contain the complete apparatus consisting of six sets of six blocks each comprising the round set A, the square set B, the oval set C, the rectangular set D, the triangular set E and the diamond-shaped set F. To each set there are six graduated sizes of blocks and each set is differently painted with the three primary colors, red, blue and yellow, and with the three binary colors, orange, green and violet. Thus the smallest circular block $A_1$ is painted or otherwise colored red, the next larger circular block $A_2$ is colored green, the next downwardly succeeding circular block $A_3$ is colored yellow, the next larger and downwardly succeeding circular block $A_4$ is colored violet, the next circular block $A_5$ is colored blue, and the next and last and largest circular block $A_6$ is colored orange.

While all of the blocks have the same height and are composed of walls of symmetrical thickness with the bottom open, the plan shape of the blocks are obviously different as required by their forms.

Problems in color and form appreciation may be studied by building up each set from the largest to the smallest block, by choosing the smallest blocks of the sets, by choosing the largest blocks of the sets, by choosing the second largest blocks of the sets, by choosing the third largest blocks of the sets, by choosing the fourth largest blocks of the sets, by choosing the fifth largest blocks of the sets.

Another action to be undertaken by the students may be to form a square with the sets, to form a square using the same colored blocks of the sets as the diagonal.

Other educational acts on the part of the students may be induced by requiring the formation of conventional designs using the blocks, by causing the students to choose the red blocks, then the six complementary green blocks, to choose the blue blocks, then the six complementary orange blocks, then to choose the yellow blocks, then the six complementary violet blocks, to choose the primary colored red, blue and yellow blocks and to choose the blocks bearing the binary colors green, orange and violet.

Figure 1:
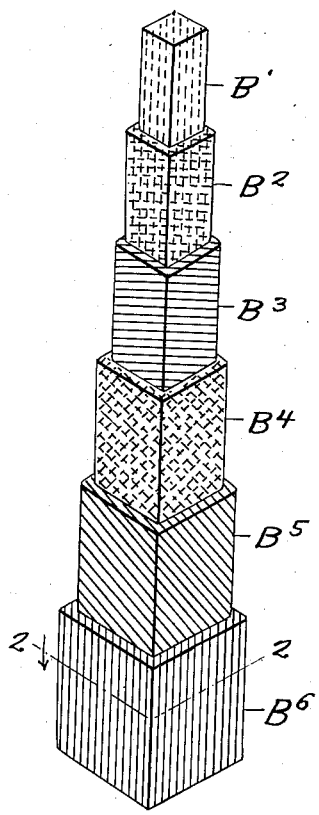
Figure 1 is a perspective view of a column of square blocks of the three primary and three binary colors.
Figure 3:
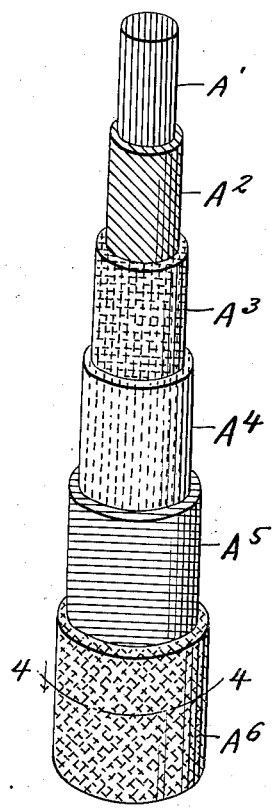
Figure 3 is a similar column of cylindrical blocks of the three primary and three binary colors.
Figure 5:
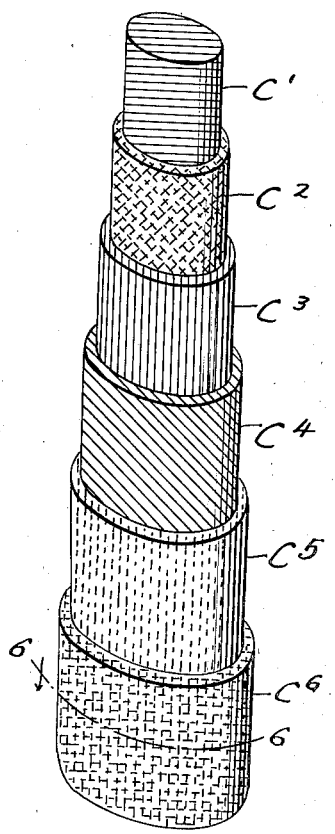
Figure 5 is another similar column of oval blocks showing the three primary and three binary colors.
Figure 2:
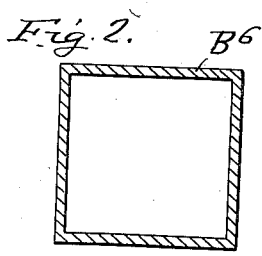
Figure 2 is a horizontal sectional view taken through Figure 1 approximately on the line 4—4 and looking downwardly in the direction of the arrow.
Figure 4:
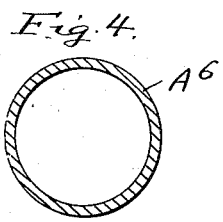
Figure 4 is a horizontal sectional view taken through Figure 3 approximately on the line 4—4 but looking downwardly in the direction of the arrow.
Figure 6:
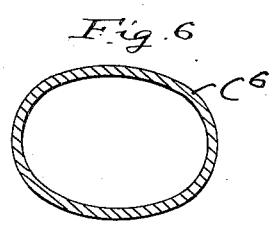
Figure 6 is a horizontal sectional view taken through Figure 5 approximately on the line 6—6 and looking downwardly in the direction of the arrow.
Figure 17:
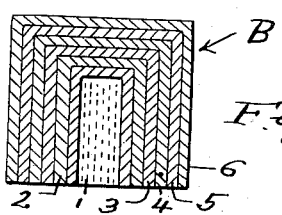
Figure 17 is a horizontal sectional view taken through Figure 16 approximately on the line 17—17.
Figure 13:
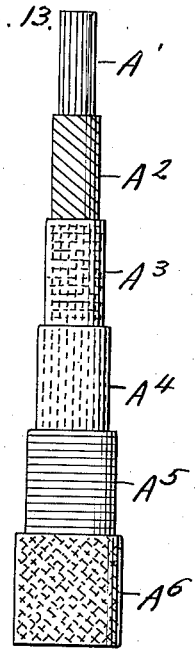
Figure 13 is an example of a column formed of blocks of all of the same shape but of different colors.
Figure 14:
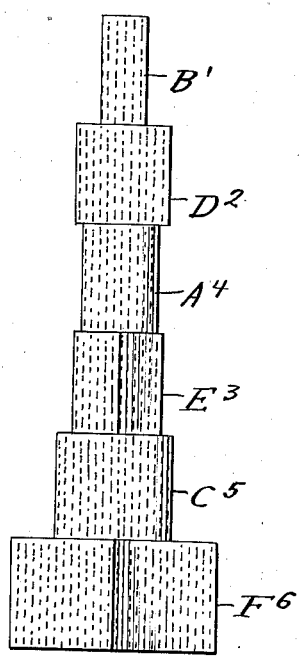
Figure 14 is a column formed of all different shaped blocks but of the same color.
Figure 15:
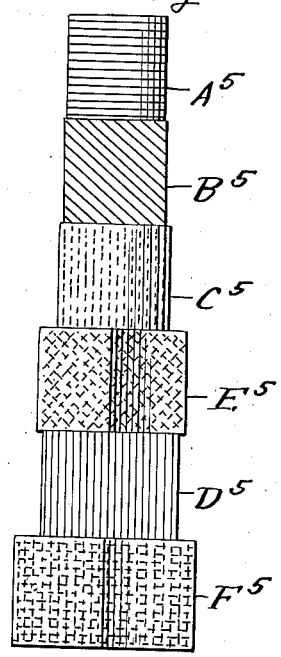
Figure 15 is a column made up of all different shaped blocks and all of different colors.
Figure 16:
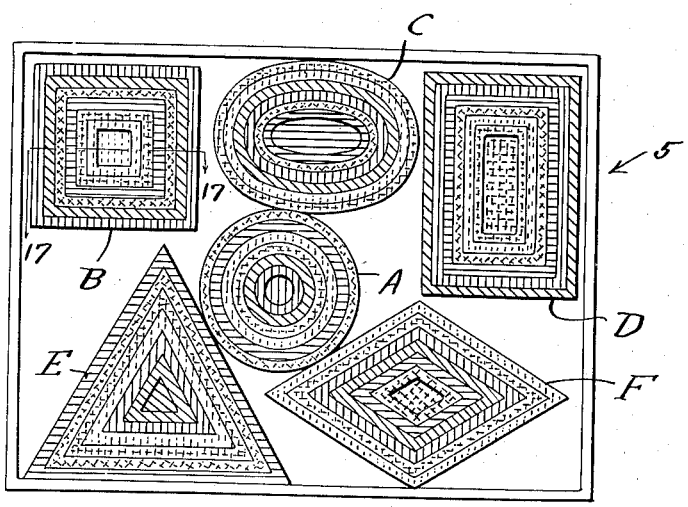
Figure 16 is a plan view of a box containing six nested series of six nested similar blocks constituting the complete apparatus.

Figure 13 illustrates an example of a completed act on the part of a student in choosing and arranging in a column blocks of all the same shape but of all different colors. Figure 14 illustrates the result of a similar action in correctly choosing blocks of all the same color but of different shapes, while Figure 15 illustrates the result of a proper building up of blocks of all different shapes having all different colors.

It will be obvious that the expression of the invention in six sets of blocks each comprising six differently colored blocks of graduated sizes, produces a mathematically calculable cooperation between the blocks and the possibilities of their arrangement in symmetrical geometric arrangements and in various color symmetries and contrasts, covering the field of common geometrical shapes and common color schemes, thereby strongly impressing the factors of color, form, and relative arrangement on the senses and memories of the students and others.

Although I have shown and described herein a preferred embodiment of my invention, it is to be definitely understood that I do not desire to limit the application of my invention thereto, and any change or changes may be made in the structure and arrangement of the parts, consistent with the scope of the subjoined claims.

Having described the invention, what is claimed as new is:

1. An educational apparatus comprising a set of blocks divided equally into a plurality of suits, each suit comprising a plurality of similarly shaped blocks of progressively increasing size, each block having at least one open side whereby all of the blocks of that suit may be snugly nested to form when nested a substantially solid block, said nest of blocks and the individual block in any suit being of a respective distinctive geometrical form, the blocks of each suit being of different geometrical form from the blocks in any other suit.

2. An educational apparatus according to claim 1, in which the blocks of each suit are respectively differently colored to disclose different primary colors and complementary binary colors in respectively different arrangements in each suit.

3. An educational apparatus according to claim 1, in which the blocks of each suit are respectively differently colored to disclose respectively different primary colors and complementary binary colors, said primary and binary colors in one suit being alternately arranged as the size of the blocks increases.

4. An educational apparatus according to claim 1, in which the blocks of each suit are respectively differently colored to disclose different primary colors and complementary binary colors, said primary and binary colors in one suit being alternately arranged as the size of the blocks increases, and in which a block of each suit is different in color from a block of the same order in size in any other suit.

5. An educational apparatus according to claim 1, in which a smaller block of any one suit is of a size that it cannot be inserted in the open side of the next larger block of any other suit thereby to facilitate stacking of the blocks.

6. An educational apparatus comprising a set of thirty-six blocks divided equally into six suits, each suit comprising six blocks of progressively increasing size, each block having at least one open side whereby all of the blocks of that suit may be snugly nested to form when nested a substantially solid block, each of said six suits having a cross section corresponding to the following well known geometrical forms, namely, square, circular, elliptical, oblong, triangular, and diamond shape, respectively, and the blocks of each suit being respectively differently colored and comprising three primary colors and three binary colors.

MARY McC. BEARY.